FIG. 2

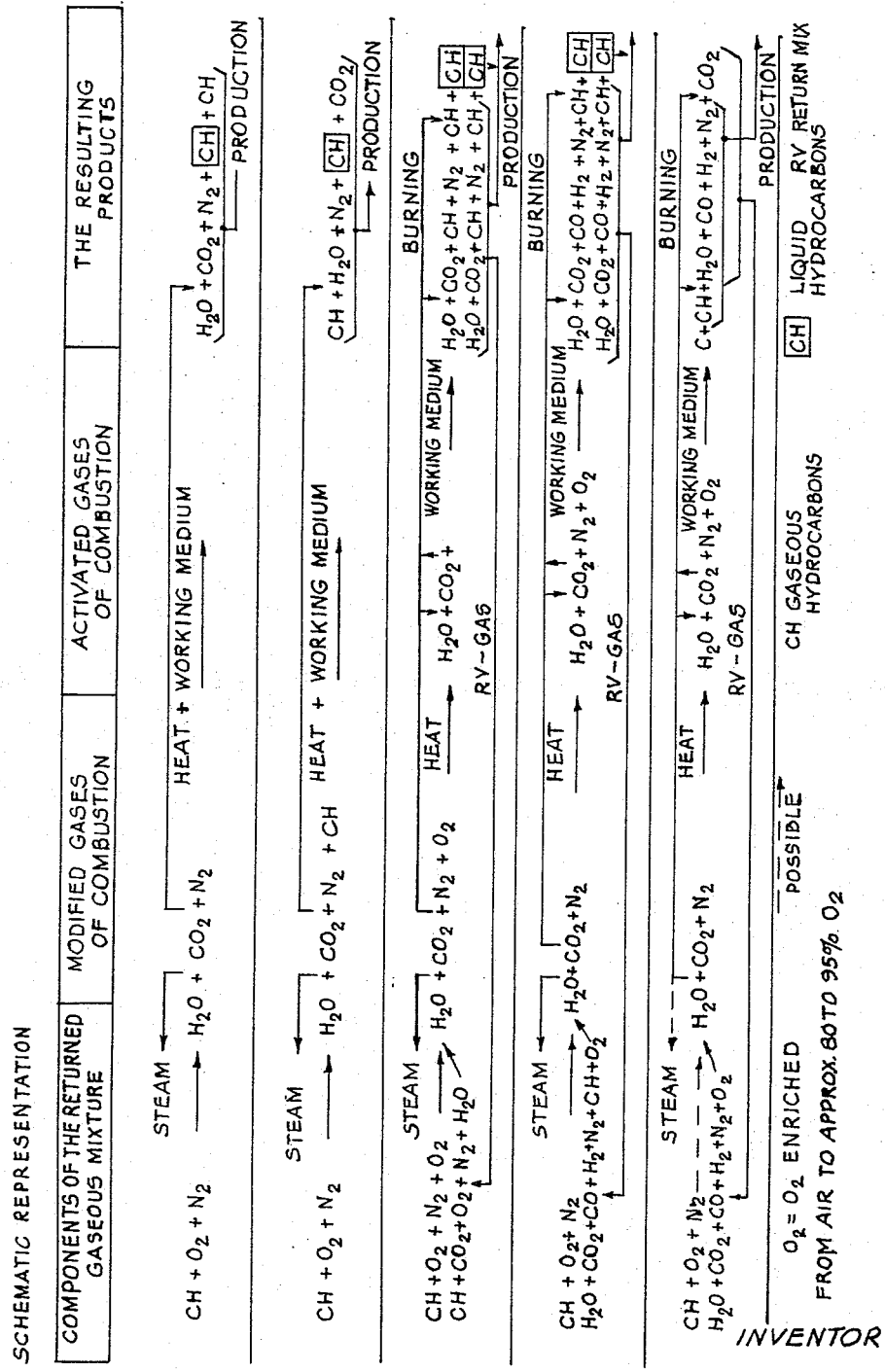

| A TABLE, SHEET I Additive uses with activated products of combustion | B grams Wt. % Tolerances | C Components for and in modified gases of combustion | | | D Modified gas of combustion with O₂ excess becomes activated gas of combustion | | | E Return gas from oil production modified gas of combustion and activated gas of combustion | | | | F Mixing components from pressure washing, modified gas of combustion and generator gas as production | | | |
|---|---|---|---|---|---|---|---|---|---|---|---|---|---|---|---|
| | | 1 V | 2 $W_1$ | 3 $W_{1a}$ | 4 V | 5 $W_1+W_2$ | 6 $W_3$ | 7 RV | 8 $W_1+W_2$ | 9 $W_3+W_4$ | 10 RV | 11 V | 12 $W_1+W_2$ | 13 $W_3+W_4$ | 14 Production |
| a Working operations and gas identification | | | | | | | | | | | | | | | |
| b O₂ admixture | gm %  % | 316.2 75.0 +25 -40 | | | 3485 76.5 +25 -35 | | | | 2306 +25 -35 | 2355 +25 -50 | | | 716 36.9 ±30 | | Gas washed with water under pressure |
| c O₂ taken over or freed | gm % % | | | | | 326→ 7.3 ±30 | 326 | | 601→ 14.8 ±35 | 601 ±35 | | | | | 229.0 ±35 | Gas from pressure water of Tier 11 |
| d O₂ formed or converted | gm % % | | 10.0 0.2 ±10 | 10.0 0.2 ±10 | | | | | | 338 ±45 | | | | | |
| e CH mixed in or taken on | gm % % | 875 20.6 ±30 | | 1360 244 +20 -50 | 875 19.2 ±35 | | 87 ±30 | 358 20.1 ±45 | | | 358 20.1 ±35 | 7.1 0.5 ±10 | 7.1 0.4 ±10 | | |
| f CH formed | gm % % | | | | | | | | | | | | | | |
| g C+CH converted | gm % % | | | | | | | | | CH916 ±35 | | | | C733 ±20 | |
| h CH 25% gasified C 69% gasified | gm % % | | | | | | | | | 25 | | | | 69 | |
| i H₂O steam | gm % % | | 1861 44.2 +50 -50 | 1861 33.3 +50 -50 | | 1862 40.8 +50 -30 | 2012 44.5 +50 -30 | 173 9.6 +50 -30 | 1174 28.7 +50 -30 | 2475 32.4 +50 -50 | 173 9.6 | 700 57.2 +50 -30 | 700 36.1 +50 -30 | 559 20.1 +50 -30 | 85 6.4 -50 |
| j N₂ (nitrogen) | gm % % | 185 4.4 ±20 | 185 4.4 ±20 | 185 3.4 ±20 | 195 4.3 ±30 | 195 4.3 ±30 | 195 4.2 ±30 | 46 2.6 ±20 | 98 2.4 ±20 | 201 2.6 +75 -30 | 46 2.6 ±20 | 14.7 1.1 ±20 | 14.7 0.8 ±20 | 48 1.7 ±20 | 47 3.6 ±25 |
| k CO₂ (carbon dioxide) | gm % % | | 2166 51.2 ±30 | 2166 38.7 ±30 | | 2172 47.6 ±30 | 2348 51.3 ±30 | 1065 59.4 ±30 | 2221 54.1 ±50 | 4591 603 ±30 | 1065 59.4 ±30 | 49.5 40.3 ±30 | 49.5 26.4 ±30 | 1034 38.5 ±30 | 98 7.4 ±10 -50 |
| l CO (carbon monoxide) | gm % % | | | | | | | 121 6.7 +40 -25 | | 305 4.1 ±50 | 121 6.7 +40 -25 | 5.0 0.5 +10 -30 | 5.0 0.2 +10 -30 | 918 33.4 ±30 | 916 69.2 ±25 |

FIG. 3

| A TABLE, SHEET II | B | C | 1 | 2 | 3 | D 4 | 5 | 6 | E 8 | | F | | | |
|---|---|---|---|---|---|---|---|---|---|---|---|---|---|---|
| m  H₂ hydrogen | gm % % | | | | | | | | | 2.8<br>1.6<br>+10<br>-30 | 4.8<br>0.7<br>+45<br>-20 | 2.8<br>1.6<br>+45<br>-20 | 4.5<br>0.4<br>+10<br>-30 | 7.5<br>0.5<br>+30<br>-10 | 21.6<br>0.7<br>+50<br>-20 | 21.6<br>1.8<br>+60<br>-20 |
| n  weight of gas | gm | 4222 | 4222 | 5582 | 4555 | 4555 | 4555 | 4094 | 7620 | 1791 | 1226 | 1942 | 2736 | 1336 |
| o  Free heat | Cal Tol.% | 10500 ±30 | 1420 ±20 | 1560 ±20 | 10500 ±30 | | 2360 ±20 | 4200 +45 -10 | 7450 ±20 | | | | 1700 +10 -20 | 4661 +10 -20 |
| p  Heat per 1000g exhaust gas | Cal | | | | | | | | | | | | | |
| q  For above ground | Cal Tol.% | 2500 ±20 | | | 2200 ±20 | | | 1100 ±20 | | | | | | |
| r  For under ground | Cal Tol.% | | 360 ±30 | 280 ±30 | | | 570 ±30 | | 980 ±30 | | | | 625 ±30 | |
| s  New heat in one m³ of stratum | Cal Tol.% | | 28000 ±20 | 24000 ±20 | | | 28000 ±20 | | 85000 ±20 | | | | 850000 ±25 | |
| t  New and recovered heat in 1 m³ of stratum | Cal | | 40000 | 36000 | | | 40000 | | 125000 | | | | 1,04·10⁶ | |
| u  Exhaust gas per m³ of stratum | Kg Tol.% | | 78 ±30 | | | | 49 ±30 | | 87.5 ±30 | | | | | |
| v  Fuels for modified and for activated gas of combustion | Kg Tol.% | 14.5 +30 -25 | 2.5 +30 -25 | | 7.7 +30 -25 | | 2.8 ±25 | 4.0 +60 -20 | 10.5 +10 -30 | | | | | |
| w  Steam formation per m³ of stratum | Kg Tol.% | 190 ±20 | | | 108 ±20 | | | 53 ±20 | | | | | | |
| x  current generated per m³ of stratum | KWh Tol.% | 52 ±20 | | | 20.0 ±20 | | | 15.0 +60 -15 | | | | | | |
| y  Nm³ O₂ per m³ of stratum | Nm³ Tol.% | 43.6 +10 -40 | | | 27.5 +10 -40 | | | 37.0 +10 -40 | | | | | 600 +10 -40 | |

INVENTOR
HANS LANGE
BY Toulmin & Toulmin
ATTORNEYS

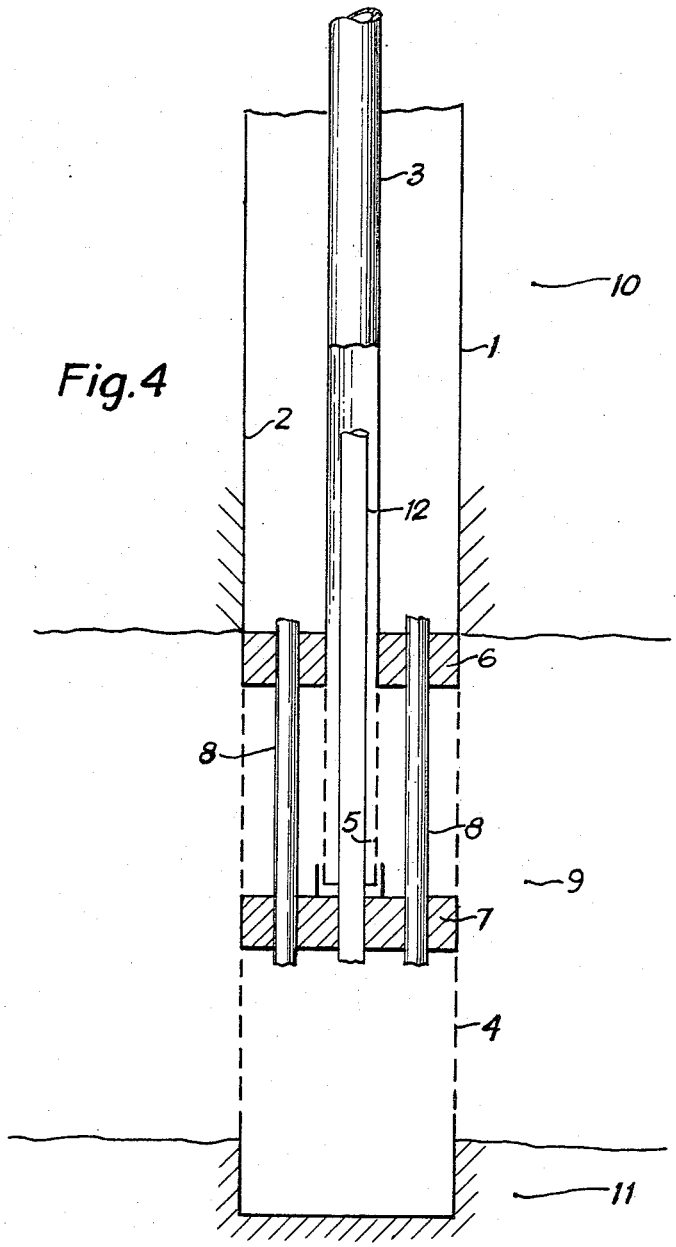

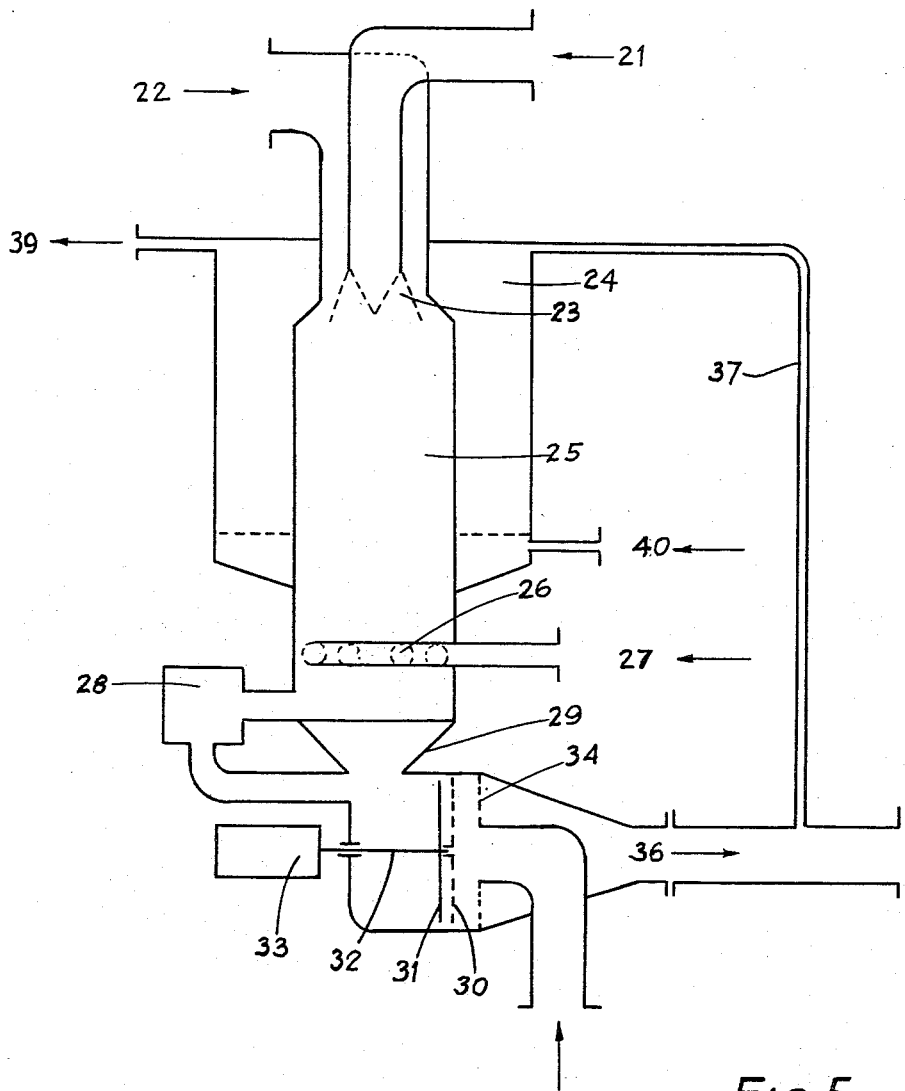
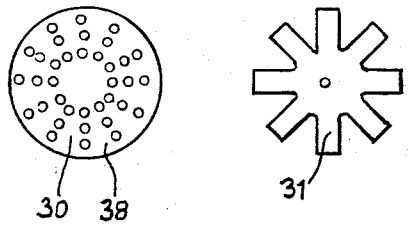
FIG. 5
FIG. 6
FIG. 7
INVENTOR
HANS LANGE

United States Patent Office 3,344,856
Patented Oct. 3, 1967

3,344,856
PROCESS FOR THE EXTRACTION OF LIQUID AND SOLID BITUMENS FROM UNDERGROUND DEPOSITS
Hans Lange, Wietze, Kreis Celle, Germany, assignor to Deutsche Erdol-Aktiengesellschaft, Hamburg, Germany
Filed Mar. 18, 1965, Ser. No. 440,852
Claims priority, application Germany, Mar. 26, 1964, 47,426
15 Claims. (Cl. 166—4)

This application is a continuation-in-part of application Ser. No. 349,589, filed Mar. 5, 1964.

The invention relates to a continuous method of extracting liquids and solid bitumens from underground deposits where injection and production borings are inserted into an underground stratum of bitumens, a combustion gas is fed to the underground deposit and ignited, the bitumens are brought to the surface in liquid and gaseous phases, a portion of the bitumens are recovered, another portion of the bitumens is recirculated into the stratum to be burned by the heat in the reaction zone and a continuous process is provided.

An object of the invention is to provide methods for the continuous extraction of bitumens from underground deposits.

Another object is to provide the gases of combustion necessary for operating the continuous process.

Other objects are to provide methods for injecting gases of combustion and flooding mediums into the ground and for extracting gaseous and liquid products from underground.

Still further objects are to provide the control of variables necessary in maintaining the continuous process.

In the extraction of bitumens from underground deposits by the insertion of borings into a stratum of bitumens, the stratum can be worked on only through the borings. The process is not only a mechanical process, but requires physical and chemical operations in the stratum for a quick and efficient working of the deposit.

The bitumens in the deposits can be classified into those of recent and fossil origin and are further classifiable into gaseous, liquid and solid bitumens. The bitumens are organic compounds which differ in their proportions of carbon to hydrogen and may contain small amounts of minerals, sulfur, oxygen, nitrogen and other substances.

Processes are known for obtaining bitumens from mineral oil and coal deposits by applying oxidizing agents and combustion and gasification processes. It is known, however, that these in situ combustion and gasification processes are very unsatisfactory. Such processes are controlled mainly by the introduction of oxidizing agents while the underground movement of the products is controlled by the amount of pressure fluid injected into neighboring borings. Instead of air alone, air strongly enriched with oxygen has been used. Without adequate preliminary treatment of the stratum and without additives to the oxygen and proper control of the combustion process, the oxygen consumption is excessive and the process is, therefore, uneconomical.

Without properly regulated controls, there will always be a non-uniform distribution of controlling agents in the stratum. With linear flow paths from the injection borings to the neighboring production borings, the presence of thin liquid deposits will always result in the formation of preferred channels for rapid flow, if use is not made of a plurality of flow paths at suitable angles to one another. Inadquate preliminary preparation and treatment of the stratum will result in low yield. During the gasification of a coal stratum only 25 to 40% of the energy in the stratum is obtained, and the generated gas is of low quality. In deposits containing liquid bitumens, too great an amount of oxygen is used for each bituminous component. The oxygen of injected air of combustion, although diluted by nitrogen, causes undesired oxidation of the liquid hydrocarbons. The resulting gaseous mixture is practically worthless. These large volumes of waste gas also produce preferred rapid flow channels in the stratum.

The requirement that the bitumens be obtained only from the borings makes it difficult to provide good producing conditions in the stratum. For this purpose, the stratum must be pre-treated in such a manner that injections and transformations in it will be as uniformly distributed as possible.

The pretreatment of deposits which are to be reached and worked only through borings is a process which does not need to be specifically related to their subsequent treatment. The pretreatments that are described here are exemplary only. Many methods are known for pretreatment of stratum with special consideration to the flow movements of the contents. If coal deposits are pretreated to produce fissures, then these now pervious coal deposits, considered in a purely mechanical way, can be treated in the same manner as deposits of liquid bitumens. The physical and chemical exploitation process is to be performed in such a manner that the solid content of the stratum will be converted into a gas of high value and also partly into liquid and gaseous hydrocarbons. The step of dissolving a gas of combustion in the stratum is only of minor necessity in the case of coal in the regions that are subjected to gasification. But during the formation of combustion and gasification zones, the water vapor and carbon dioxide components can be valuable factors for maintaining equilibrium. Technically valuable products are, however, obtained only when the treating agents are introduced into the stratum carefully and all unfavorable components, such as nitrogen, kept so low that their injurious effects are negligible. The treating agents should be selected and mixed in such a manner that it will be possible to establish and maintain equilibrium conditions in the stratum from above ground. Gases of combustion are such agents.

The control of the continuous process for extraction of bitumens from underground by the use of modified gases of combustion can best be illustrated by the figures and a specific example.

In the figures:

FIGURE 1 is a schematic representation of the different modified and activated gases of combustion used in the present invention;

FIGURES 2 and 3 are tables of the variables involved in the control of the process of the present invention;

FIGURE 4 is a cross-section of an apparatus to be inserted into injection and production borings for control of the extraction of bitumens in an underground stratum;

FIGURE 5 is a cross-section of an apparatus for producing modified and activated gases of combustion;

FIGURE 6 is a plan view of the distributor disk located in the apparatus of FIGURE 5; and FIGURE 7 is a plan view of the rotating disk located in the apparatus of FIGURE 5.

In FIGURE 4 the deposits 9 of liquid or solid bitumens are located between the caprock 10 and the floor 11. A boring 1 is sunk into these deposits and the casing 2 which is perforated at 4 is installed. Into this casing a tubing 3 whose lower end is perforated and which carries packings 6 and 7 is lowered. The packings are spaced a predetermined distance apart by pipes 8 and can be sealed against the inner wall of the casing in the region of the perforations. Such an installation provides two separate passageways to the stratum. Hot activated gases of combustion with only little free oxygen can be introduced through the tubing 3 into the upper portion of the stratum while cooler activated gases of combustion which have been enriched with large amounts of oxygen can be introduced through the annular space between the tubing and the casing, and through tubes 8 into the lower portion of the stratum which is filled with liquids. The double packing has the effect of reducing heat losses.

It is also possible to flood the lower portion of the stratum with water delivered through a separate tube 12 extending through the packing, while an activated gas of combustion is introduced into the stratum above the packing. The portion of the stratum from which the deposits have been removed is filled with water so that the treating fluids which have been introduced above the packing can be driven into the deposits by the advancing water front. By the introduction of this hot activated gas of combustion, this borehole is used as a treatment or injection boring, while a neighboring boring which serves as a withdrawing or production borehole delivers liquid and gaseous contents of the stratum to above ground. The production and injection borings are connected above and below ground in a closed system. A closed circulation passes above ground from the top of the production borehole to the top of the injection boring and in the underground stratum from the bottom of the injection boring to the bottom of the production boring.

It is necessary, however, in the use of activated gases of combustion that a portion of such gases be diverted before reaching the treatment boring and be reacted with oxygen in a pressure-tight fire space of a steam boiler into a modified gas of combustion, and by the addition of further oxygen into activated gas of combustion, to be returned to the closed circulation ahead of the treatment boring for introduction into the stratum above the packing.

Such a steam boiler is illustrated in FIGURE 5. In this apparatus, simultaneous mixing is effected with additional components with which the combustion gas will form a homogeneous mixture in the form of very small bubbles by distribution with heat transfer medium. The apparatus consists of a combustion chamber 25 to which gaseous or liquid hydrocarbons are supplied through line 21 at pressures ranging from 10–20 atmospheres gauge. An oxygen carrier containing 80–95% oxygen is introduced through line 22. Combustion takes place in the burner 23. The combustion products formed in the burner contain a higher thermal energy than is either necesary or desirable for the next step of the process, i.e., the evaporation of the light hydrocarbons and the mixing thereof with the combustion gas. The combustion chamber 25 is accordingly surrounded by a steam generator 24 in which part of the thermal energy is transferred into high pressure steam of 55–75 atmospheres gauge (56–76 absolute atmospheres) pressure at a temperature of 475–525° C. The amount of the thermal energy that must be utilized in this manner depends upon the amount and composition of the light hydrocarbons to be evaporated. Water is supplied to the boiler through pipe 40 and the steam formed is removed through conduit 39.

Light hydrocarbons are introduced through conduit 27 containing liquid distributors 26, into the combustion chamber 25, where they are evaporated and homogeneously mixed with the gas, which at this point has a temperature which makes it possible to evaporate the $C_1$–$C_7$ hydrocarbons at the existing pressure with no substantial degree of cracking. Should additional cooling be required in the evaporation zone, part of the liquid heat transfer medium to be treated can be supplied through a pipe (not shown in the drawing) from the conduit 35.

By mixing with light hydrocarbons, a combustion gas is obtained having the composition shown in the table below. Depending upon the operating pressure and temperature, the kind of deposit being treated, and the weight ratio of the combustion gas to be supplied on the basis of these data, per unit of heat transfer medium, the composition may vary between the tolerance limits set forth below:

|  | Water Vapor | Carbon Dioxide | Hydrocarbons $C_1$–$C_7$ (vapor or gas) | Nitrogen |
| --- | --- | --- | --- | --- |
| Percent by volume | 53.08 | 26.27 | 25.53 | 4.62 |
| Upper tolerance limit, percent | +50 | +30 | +40 | +30 |
| Lower tolerance limit, percent | −30 | −20 | −20 | −50 |

It has been found that under such operating conditions the amount of nitrogen present is completely dissolved in the heat transfer medium.

The combustion gas is compressed by the compressor 28 to a pressure of 40–75 atmospheres gauge into the mixing space 29. The heat transfer medium is fed into space 29 through conduit 35. The gas is dissolved therein and the heat transfer effected. In order to bring both phases into intimate contact with each other, the stream of heat transfer medium is subdivided at the point of introduction into the mixing space by the action of the perforated disk 34, the combustion gas being introduced through the distributor disk 30, in which a number of holes 38 are arranged in lines and circles (as shown in the drawing), and ahead of which a winged cross 31 rotates and which is driven by the motor 33 through shaft 32. In this manner at one revolution, e.g. 600 holes are covered at one time, causing the gas to be distributed in the heat transfer medium in the form of small bubbles. During this operation, the heat transfer medium is heated to a temperature of 50–125° C. higher than that at which it enters the chamber. If required, additional heating can be effected by adding to the mixture high pressure steam from the boiler 24 through conduit 37. The heat transfer medium thus mixed with the combustion gas and heated to a higher temperature is then passed through conduit 36 into a drill hole through which it passes into the deposit to be recovered.

In the deposits of the stratum the activated gases of combustion produced in the steam boiler are converted again into modified gases of combustion. If flooding water is introduced through the injection boring into the deposits below the packing, then a similar packing with separate conduits is positioned in the production borehole. With the built-in packing with separate conduits it will be possible to withdraw only those stratum contents which have become mixed or emulsified with the flooding water and to keep such mixtures separate from the circulating material above the packing.

When such a packing with separate conduits is positioned in the bituminous stratum, it is possible, especially when the deposits are in horizontal layers, to change the direction of flow of the advancing product and to separate it into two components. In horizontal strata the introduction of marginal or flood water will force the deposits from the lower portion of the stratum into the upper portion thereof with both a horizontal and a vertical flow component. The more important flow component leads in the direction of hanging of the strata and imparts to the displaced deposits an upward flow component. The result will be that the activated gases of combustion and heat carrying fluids such as the contents of the stratum, mixed with modified gases of combustion or with cooled activated gases of combustion, which flow horizontally, will mix with the upwardly crowding deposits in a second direction of flow. The production borings are then at a structurally higher level. If, however, there has already been an appearance of water in nearly all the borings of the stratum, then all borings can be provided with packings having separated conduits. The treatment borings can remain treatment borings while the production boreholes surrounding the treating boreholes become delivery conduits in their upper portions. From the lower portions of the borings, sufficient flooding medium can be withdrawn so that water domes will not be formed.

The introduction of packings with separated conduits makes it possible to introduce oxygen directly into the stratum if below the packing an enriched oxygen in nitrogen is introduced and burned in the accumulation of mineral oil and underground water, while above the packing, gases and vapors such as air, nitrogen or carbon dioxide mixed with steam are forced into the stratum. The gases and vapors introduced above he packing act mainly as displacing agents, and as such they flow more slowly than the gases of combustion from the lower portion of the stratum, so that from the heat of combustion in the lower portion of the stratum, the upper portions will become warmed whereby the effectiveness of the displacing medium will be increased. The difficultly soluble gases, such as the nitrogen, are introduced into the upper portion of the stratum in only such amounts as to increase to the desired extent the velocity of flow of the liquids in front of the reaction zone.

If small amounts of air are added to the steam that is introduced into the upper portion of the stratum as a displacing agent, then such air can support combustion in addition to its action as a displacing agent. This provides a limited source of heat which insures the maintenance of a warmed-up path in the upper portion of the stratum.

It is also possible that above the packing displacing agents such as nitrogen are introduced through separate conduits for only a few hours to form a gaseous cushion in the upper portion of the stratum. Beneath the packing oxidizing agents with inert gases are introduced, e.g. air or enriched oxygen, and in mixtures of steam and carbon dioxide. By consuming the oxidizing agents in combustion processes the inert gases are set free and can migrate into the gas cushion above. If in this case the packing is built into the upper portion of the stratum, then the inert gases which have migrated upwardly can flow back from the gas cushion into the boring to be returned through the second conduit to above ground. The same boring can therefore serve to introduce substances into the stratum and to remove substances therefrom. Such a boring can therefore serve as a treatment boring and as a production boring. The pressure difference in the gas cushion must be kept somewhat lower than in the lower portion of the deposit, and may be from a few tenths of an atmosphere to several atmospheres. The proportion of free non-dissolved inert gases in the deposit can be diminished in that manner.

With large amounts of water in the stratum, small amounts of a mixture of oxygen and hydrocarbons can at times be fed into the deposit above the packing and ignited by catalysts or incandescent carbon particles above the packing so as to form an additional source of heat for the flow path. This is particularly advantageous when the greater portion of the oxygen with or without the stratum contents is being burned in a reaction zone at a greater distance from the boring while water is exerting pressure on the flow path.

It may be advantageous, before the introduction of the activated gas of combustion, to maintain for a period of several months a small production period. During this period production borings initiating the direction of flow of the stratum contents to be maintained during the subsequent full production are provided. This will assist in maintaining a more uniform admixture of treating agents into the stratum with repeated building up of travelling waves. Such production, however, is feasible only in strata with great porosity. Obviously, such a two-phase production can also be used where the stratum contains solid bitumens capable of being converted into liquids, provided fissures have already been produced in the stratum.

When the invention is used in coal formations, a row of borings is sunk and these borings are then brought into communication with one another by fissure formation. For preparing the deposits and rendering them porous, suitable substances are injected through so-called treatment borings, and the products which are produced by reaction of those substances upon the coal are then removed through neighboring boreholes. By the introduction of activated gases of combustion, portions of the coal are converted into gas which is conducted through production boreholes and into the pressure-tight firing space of a steam boiler. The gas is burned with oxygen to produce a modified gas of combustion and is then mixed with additional oxygen to produce an activated gas of combustion. It is then delivered to the treating boreholes for return to the reaction zone of the stratum where it reacts with more of the coal to produce additional gas to be returned to the circulation above ground. It is possible to perform the combustion in the pressure-tight fire space of the steam boiler by means of air. Portions of the gas of combustion are expanded in a turbine for doing work. Another possibility is to take the carbon dioxide and the steam from the gases that are received from the leading borings and then to mix such carbon dioxide and steam with oxygen in an above-ground circulation to produce an activated gas of combustion to be returned to the treatment boring.

A second direction of flow of the gasified bitumens to the production borings can be established by creating periodic pressure changes in the gases by alternate compression and expansion producing movement in all directions and better mixing of the gaseous substances.

If packings with separate conduits are positioned in the lower portions of the treating and production bores, then liquid hydrocarbons produced from the coal and which may come into contact with extremely hot gases can be protected against thermal decomposition by being covered with a veil of steam. The steam is introduced below the packing of the treatment boring and flows out over the liquid hydrocarbons as a protective covering. The mixture then received in a production boring below the packing is removed through one of the separate conduits.

The proportion of nitrogen in the enriched oxygen can be temporarily increased, as shown in the table of FIGURE 2. On strata with liquid contents, it is advantageous to produce the first gas filled path from the treatment boring to the production boring with a larger proportion of the inert and difficultly soluble nitrogen. This is particularly true if the liquid contents include marginal and flooding water from a previous oil-producing operation. This added nitrogen facilitates the formation of a gaseous path from the treatment borings to the production borings and offers the possibility of effecting an easier separation between the water and the gas-filled path. If the gas-filled path has migrated ten meters or more, then it has passed over sufficient masses of exhausted rock so that the quantities of water which flow over these exposed hot rocks will evaporate and thereby form an ever increasing steam bridge between the trailing water and the migrating reaction zone during the remainder of the production time. This steam bridge also acts as a displacing medium for the treated contents of the stratum. Into this readily permeable steam bridge the simultaneously activated gas of combustion which occurs behind the migrating reaction zone is conducted through the stratum.

Varying amounts of activated gas of combustion can be conducted into the treatment and production borings in such amounts that the total quantity of injected medium from neighboring boreholes remains constant. Any excess that is received by one borehole is compensated by a shortage in another borehole. These variations of amounts can be made at equal time intervals and have for their purpose to make available large amounts for short periods of time while the activated gas of combustion is produced at a uniform rate, and thereby to permit a strong local increase of activity in the reaction zone, especially when the borings are far away from one another.

The circulation can be resumed periodically. If the reaction zone has migrated a considerable distance, e.g., 100 to 150 m., there is left behind it an emptied storage chamber of rock in which inflowing water vaporizes. At higher pressures there will eventually be formed, not steam, but hot water which can be at temperatures between 200 and 250° C. At this time activated gas of combustion can be introduced and the highly heated encroaching water in the stratum acts as a displacement medium for the hot mineral oil, water and carbon dioxide mixture in front of the quenched reaction zone.

By sinking another row of boreholes and flooding the stratum up to the next row of boreholes, the fluid bitumens are removed therefrom. In the next row of boreholes the circulation of heated fluids and activated gases of combustion from the treatment borings to the production borings is resumed, with the former production boring becoming a treatment boring. The circulation is continued until a large amount of heat has again been produced in the rock formations from which the prepared mineral oil is displaced by flooding with hot water and is brought to above ground. In this manner there will be a better utilization of the heat, and the activated gas of combustion can then be driven by flooding into other parts of the stratum. It is also possible, however, for the activated gas of combustion to be introduced into the deposits only from injection borings which are surrounded by production borings or arranged in rows with the latter, but the result will be a smaller production and a greater consumption of activated gases of combustion.

If in a stratum a treatment over a packing with separate conduits is performed at the same level and mixtures are to be avoided, then the fluids above and below the packing should be introduced at the same rate. The differences in pressure between the surrounding space and the ascending pipe are very small so that there will not be any sealing off difficulties with the packings.

Since the activated gas of combustion has to be brought to high pressure in the stratum, the air that is used for the production of the enriched oxygen needs to be brought to only about 5.5 atm. so that all the energy that would have to be spent on compression of the gases is saved by the use of activated gases of combustion.

This differentiated use of the activated gases of combustion means that these gases can be adjusted to every deposit, and in fact in two-fold form to a single deposit.

The components of the gaseous mixtures not only improve the chemical reactions and the formation of solutions to produce better yields, but the components of the gases of combustion can be used to control the processes in the strata and in that manner support an in situ combustion in the stratum.

The enrichment of the added oxygen component in activated gas of combustion increases the reaction velocities and thereby improves the reaction equilibria. The migrating reaction zone is always confined to small spatial dimensions which makes canal formation difficult.

The steam and carbon dioxide components serve not only to facilitate production by condensation and the formation of solutions, but also to lower the temperature peaks in the reaction zone by conversions and to prevent rock formations and ashes from being melted by the temperature peaks in solid coal deposits. The steam in the reaction zone produces $H_2$ and $O_2$ while the carbon dioxide produces oxygen and carbon monoxide. The ratios of $H_2$ and CO to $CO_2$ thus produced are measurable. If the stratum does not already contain any colder parts, then portions of the steam from the introduced gas of combustion will condense here, and a returning portion of $H_2$ is the result and indicates a non-uniform structure of the reaction zone. Since, however, water vapor and carbon dioxide will react in various ways under the changing temperature conditions of the reaction zone if there are no cold condensation products present, the degree to which they have reacted will serve as an indicator of the temperature. With the possibility of being able to perform the process in the stratum over two additional factors in a certain temperature range, the amount of good quality product that can be obtained will be increased. As already stated, the same process can also be used in a prepared coal stratum.

The composition of gases that have been produced from coal deposits differ naturally in comparison with the production of mineral oil because the ratio of hydrogen to carbon is different in the two cases. Hydrogen combines with twice as much oxygen as the same weight of carbon, and since a large portion of the carbon is gasified only into CO, the consumption of oxygen will be greatly diminished by the use of activated gas of combustion. This activated gas of combustion is converted into an oxygen-free gas and its hot gasification gases make it possible to obtain the major portion of the degassed gases of the coal without subsequent oxidation. The high oxygen content in activated gas of combustion produces such high gasification temperatures that likewise with the steam and carbon dioxide components in activated gas of combustion it is possible to effect a temperature control during the gasification process in the deposits and a horizontal expansion of the region under treatment.

It is possible also here to produce in situ a gasification from which it can be ascertained by generator gas analysis in which range the underground gasification process is occurring so that the amount and composition of the introduced activated gas of combustion can be regulated accordingly so that in the coal stratum there will be a horizontal expansion of the reaction zone and not a formation of canals. This gasification process is further improved if the gasification in the coal stratum is performed under a pressure of about 12–16 atmospheres. The amount of oxygen in the activated gas of combustion under the conditions prevailing in the stratum is increased by more than ten times its volume. This further improves the process in the reaction zone and also speeds up the process and results in a horizontal expansion of the reaction zone.

By using a pressure of about 12 atmospheres and with further enrichment by oxygen, there will be a formation of methane in the reaction zone so that a gas from a coal stratum will be similar to the gas from oil production with activated gas of combustion, both having a heating value of over 3500 Cal./Nm.$^3$. The ratio of hydrogen to carbon in washed generator gas has been greatly increased.

The use of pressure in a coal stratum is put to another useful purpose. Great care must always be taken to avoid the burning of channels and every possible precaution must be taken to prevent this from happening. If the pressure in the coal stratum is changed regularly, e.g. every hour between 15–10 atmospheres, then during these regular pressure changes there will also be volume changes of the introduced gases containing oxidizing agents so that besides their original directions of flow they will also move in transverse directions. These transverse movements occur, e.g. in the relatively small pore space which remained after the first degassing in consequence of the pressure changes and the resulting compressions and expansions which occurred in these pore spaces. The oxidizing agents are thereby caused to enter these pore spaces in which they undergo sudden expansions whereby the pore spaces are enlarged and become adapted for a flow of oxidizing agents therethrough. This also gives the oxidizing agents a larger space in which to react, thereby further increasing the volume of that space. This compression and expansion with its flowing movements in all directions also increases the yield by putting the deposited articles of ash into motion, thereby exposing covered surfaces of the coal so that the exposed portions are now accessible for gasification. The use of pressures from 15-10 atmospheres in the coal strata makes it possible for the borings in coal strata to have diameters of about 100 mm. if about 5000 m.³ oxygen (at 15° C. and 1 atm.) in activated gas of combustion are to be introduced per hour into the boring.

In oil deposits the pores which are filled with oil can also become filled with oxidizing agents because of changes of pressure. Every action which products flow in other directions effects better mixing and thereby makes it possible, as previously mentioned, to proportion the active agents according to the packing densities of the bitumens. This periodic change of pressure can be exceeded by the pressure changes caused by varying loads. Since several borings in the coal strata which are not connected directly to one another are treated simultaneously with activated gases of combustion, the uniformly changing pressures can be produced, with the activated gas of combustion supplied at a uniform rate, in such a manner that every treatment boring receives its maximum amount and therefore its maximum pressure during the same time, while another boring receives its smallest amount and therefore its smallest pressure. Since the exhausted areas of the stratum around the treatment borings offer only little resistance to flow, the pressure changes can be easily produced. Since the activated gas of combustion in each case contains adequate amounts of oxygen, there will remain good reaction zones even in the region of low pressure. The ignition after the first introduction of the oxygen containing gases can be accomplished most simply by blowing incandescent coal into the stratum with the oxygen. After a short time, the temperature in the stratum in the neighborhood of the reaction front becomes so high that even after the flame is extinguished by lack of oxygen, the temperature still remains above the ignition point so that combustion will be resumed immediately upon the introduction of more oxygen.

If more than 3000 to 4000 m.³ oxygen per hour is used in underground deposits or stratum portions, for the burning and gasification of the stratum contents in the pressure range of 20-5 atm., or a multiple of that amount in strata with high packing density of the bitumens and with a heat of combustion of 3,000,000 Cal. per m.³ of the deposit, then it seems expedient not to take the components of the activated gas of combustion from a modified gas of combustion.

The production of large amounts of oxygen requires much electric energy so that the energy that is necessary for exploiting a bituminous stratum is an important consideration in order to keep all operations within economical limits. It seems advisable therefore to burn a considerable portion of the gasification gas from the stratum with air under stratum pressure in a fluid-tight fire space of a steam boiler for producing super-heated steam under high pressure, and to dissolve the carbon dioxide of a portion of the gases of combustion in water under pressure, and then to drive the carbon dioxide out again by heat while it is kept under pressure. This carbon dioxide and steam that has been expanded in turbines can be mixed over injectors under high pressure, so that in this manner large amounts of steam and carbon dioxide are produced and are mixed with large amounts of oxygen to produce an activated gas of combustion. The greater portion of the heat from the gasification gas produces steam which is passed through turbines to produce much more of the electric energy than is needed, and the steam that is used in this process.

In the representation on FIGURE 1, the conversions and treatments are shown schematically. The process begins with the production of a modified gas of combustion. There is first produced from a modified gas of combustion, an activated gas of combustion which can be adjusted to different kinds of deposits to produce best results. Circulation in closed paths can be provided, with provision for the conversion of the individual components. The energy that is contained in the gases can also be used efficiently above ground for the production of electricity or steam.

In the table on FIGURES 2 and 3 are shown four different methods (columns C, D, E, F) of preparation using oxygen and material from the stratum. In each of these four methods the weights of the components, the corresponding percentages, and the tolerances (of the percentages) are given, although it would also be possible to give the values for one cubic meter of the stratum. The free energies are also those for one cubic meter of the stratum.

In the table, $W_1$ to $W_4$ are the individual working operations wherein $W_1$ is the production of modified gas of combustion; $W_2$ is the production of activated gas of combustion; $W_3$ is the in situ combustion; and $W_4$ is the recovery of the modified gas of combustion of $W_3$. V is a mixture of the various products, RV are the components of such products as are used for the production of the modified gas of combustion. The amounts of the deposits are not given because the amounts are different for the different strata. The values given in the table can, however, be adjusted to any stratum.

In Example E all four working operations are to some extent tied up with one another.

In tier 7, the components of the mixture are taken from the returned gas RV of tier 10 which is drawn off from the treated and produced mineral oil. It contains gaseous hydrocarbons of line e of (column A).

In lines b to h, the amounts of fuel and oxygen are given. The additional components are given in lines i to m. In the first working operation, in tier 8, line b, the oxygen is added so that a modified gas of combustion is produced whose components are found in lines i-k. Since an excess of oxygen is chosen, a readily activatable gas of combustion is produced by combustion in the boiler above ground with the oxygen of line c. The second working operation has therefore commenced. Since, however, for a gasification in situ in a mineral oil stratum large quantities of oxygen are necessary, additional oxygen is provided from line b of tier 9 for working operation 2. The working operation in tier 8 has produced a modified gas of combustion which does not contain any $H_2$ or CO so that there will not be any disturbance caused later by these components. In tier 9 the activated gas of combustion is brought into the stratum with the combustible material of line g for burning and gasification in the stratum, whereby in the reaction zone additional oxygen of line d is produced from the $CO_2$ by reaction with the steam.

Lines i to m in tier 9 give the fourth working operation in which the resulting components can deliver heat to the deposits.

In tier 9 the products of lines l and m are ascertained by gas analysis of the gas of tier 10, together with the gases that were driven out from the produced mineral oil so that the gasification process in the stratum can be controlled by changing the amounts of fuel or oxygen or by introducing additional steam. The free gases from tier 10 are returned to tier 7 in a cyclic manner. The processes in column C, D and F can be analyzed in a similar manner. Lines n to v give information as to how much of the added heat is applied to the deposits and how much remains available for other purposes. Amounts by weight are given only for those fuel and oxygen components which have not taken part in the reactions, because after such reactions the amounts by weight will be of the reaction products. The formation of a modified gas of combustion in the fire chamber above ground also results, as the table shows, in reactions of the CO and $H_2$ components so that after working operation 3, only the newly produced portions of CO and $H_2$ enter into the gas analysis and from the results thereof it will be possible to guide and estimate the reaction zones.

For the operations in column F, in FIGURE 2, gasification under pressure is performed. The resulting generator gas while under its production pressure is washed with water to free it not only from dust, but also in large measure from $CO_2$ and steam. From the wash water that is under pressure, the dissolved gases can be driven out by heat to produce a gas according to tier 11. In column F, the gas in tier 14 can also be converted into a modified gas of combustion free from CO and $H_2$ in a fire chamber, so that in working operation 3 only newly formed CO and $H_2$ will be present.

The table in FIGURES 2 and 3 has been calculated numerically and, therefore, constitutes an example that is suitable for practical uses. The operations in tiers 5, 8, 9, 12 and 13 are given in pairs, for the reason that the strata operations $W_3$ and $W_4$ follow in rapid succession, as do the operations $W_1$ and $W_2$ above ground. From the table these processes can be easily analyzed. The modified gas of combustion is also included in this table because it contributes to a clearer understanding of how condensations and new vaporizations in the stratum can result in the formation of hot waves travelling in front of the reaction zone in working operations $W_3$ and $W_4$ with increased strength.

For the extraction of liquid and solid bitumens by means of oxidizing agents, the amount of such agent that is used per kg. of deposit is of economic importance. It may be possible to obtain the liquid portion of a stratum without the introduction of additional materials while other portions would have to be subjected to treatments for counteracting the cohesive forces and other peculiarities of the stratum. These residual but obtainable portions of mineral oil in the stratum amount to about 70 kg./m.$^3$ with a mass tolerance of ±30%. Since according to column E tier 8, line y, every m.$^3$ of the stratum uses up about 37 Nm.$^3$ oxygen, 1 kg. of the treated material of the stratum with the residual oil content would use about 0.5 Nm.$^3$ oxygen with a tolerance of 30%. If introduction of the oxidizing agent is commenced at the beginning of the operation, then the oxygen consumption per m.$^3$ of the stratum will not be any larger because the soluble gases of combustion will quickly force the movable portions of the mineral oil out of the range of the reaction zone.

In strata with coal deposits the total gas content and smaller portions of the liquid content are converted, according to column F, tier 13, line y. 600 Nm.$^3$ oxygen are used per m.$^3$ of the stratum, which with 1300 kg. coal per m.$^3$ of the coal deposit amounts to 0.465 Nm.$^3$ oxygen with a tolerance of 30% per kg. of deposit. The amount is of the same order of magnitude as for mineral oil.

A good exploitation of the stratum does not depend on the treating agent alone, but also in large measure depends on the amount introduced during unit time through a unit portion of the entire cross-sectional area of the stratum that is being contacted by the medium that is received from the treatment boring regardless of the permeability of the deposit. This cross-sectional area moves gradually away from the treatment boring and as a result becomes progressively larger, although in what measure depends on the method of treatment. For oil bearing strata, the hourly flow of oxygen per m.$^2$ of stratum cross-section amounts to 0.65 Nm.$^3$ with a tolerance of +35–50%. At higher levels where the stratum is more porous, the amounts would be larger. The plus tolerance can be increased to +65%. In any case, the contents of the stratum in front of the reaction zone must be changed sufficiently so that the productivity of the stratum will not depend on the nature of the rock formation.

For coal deposits the hourly flow of oxidizing agent per m.$^2$ cross section should be equivalent to about 18.5 Nm.$^3$/hr. oxygen with a tolerance of ≠45%. Naturally, the amounts of steam and carbon dioxide that are given in the table of FIGURE 2 should remain in the same ratio to the amount of oxygen.

Underground strata can have a very high water content, either nautrally or as the result of flooding, when the use of activated gases of combustion is commenced. This results in additional oxygen consumption for the vaporization of such water. For mineral oil deposits a water content up to 10% in the oil of the stratum is considered normal, but if the amounts are greater, then for every additional 10% the amounts of added oxygen in line b, tiers 4, 8 and 9 of columns D and E for the same tolerances would have to be increased 3%, while the amounts by weight of steam in line i, tiers 4, 8 and 9, would be diminished by the same percentage. For coal deposits a 5% water content in the stratum is considered normal and for every additional 5% of water the parts by weight of oxygen in line b, tier 12, group F for the same tolerances would have to be increased by 3%, while the amount of steam in line i, tier 11, would be diminished by the same percentage.

EXAMPLE

*Problem.*—A mineral oil deposit has a depth of 24 m., the porous space has 27% useful volume, and the distance between the treatment and production borings is about 275 m. The pressure in the startum is 130 atm. The water in the porous space amounts to 140 liters, so that 130 liters of oil are still present. In the stratum the mineral oil has a specific gravity of 0.8 kg./l., so that in 1 m.$^3$ of the stratum, about 104 kg. oil are present, to be obtained by the use of activated gas of combustion.

*Solution according to the table of FIGURES 2 and 3*

The oxygen consumption per m.$^3$ of deposit, according to line y, tier 8, is normally 37.0 Nm.$^3$+10–40%. Since the water content in the stratum is about 50%, the oxygen consumption is increased by 12% to 41.5 Nm.$^3$, equal to 59.5 kg. In one hour 6000 Nm.$^3$ oxygen are introduced through one or more borings, so that in one hour 144 m.$^3$ of the stratum can be treated with the oxygen of the activated gas of combustion. With an introduction of 41.5 Nm.$^3$/m.$^3$ of the stratum, the temperature of the reaction zone will be about 760° C. The consumed fuel consisting of hydrocarbons of the stratum, amounts to 17.5 kg./m.$^3$ of the stratum because of the large amount of water content (line v, tiers 8 and 9), with the plus tolerance and the 12% increase of the amount of oxygen.

The hydrocarbons behind the burning front, which cannot be obtained, amount to 3.5 kg. per m.$^3$ of the stratum, so that 21 kg. mineral oil become unavailable, and hence from 1 m.$^3$ of the stratum 83 kg. mineral oil are produced. 7.4 kg. of the fuel are used in the first process step and 10.1 kg. in the second process step. In the first process step 7.4 kg. hydrocarbons are burned with 24.4 kg. oxygen under a pressure of 108 atm. to a modified gas of combustion. Of the heating value of 82,000 cal., 10,300 cal. pass into the stratum with the hot modified gases of combustion mixed with 35.1 kg. oxygen in the second process step as activated gas of combustion into the stratum to burn 10.1 kg. mineral oil in the deposit, so that there will be liberated 111,300 cal. per m.$^3$ in the stratum. All of the products of combustion will dissolve in the contents of the stratum and will improve the production process by heat, condensation and solution and will displace 83 kg. mineral oil per m.$^3$ of the stratum during the burning. The dissolved products of combustion with 77.0 kg. have a volume of about 95.0 liter in the stratum so that the total displacement in one m.$^3$ of the treated stratum amounts to about 160 kg. mineral oil, which when expanded by the heat in the stratum will be increased to about 175 kg. mineral oil from one m.$^3$ of the stratum. If 144 m.$^3$ of the stratum are treated per hour, then this will amount to a production of 25.2 tons/hour and only about 65% of the stratum will need to be treated with activated gases of combustion.

The steam from the steam boiler in which the modified gas of combustion is produced, furnishes $$82{,}000 \text{ Cal.} - 10{,}300 \text{ Cal.} = 71{,}700 \text{ Cal.}$$

which for one m.³ of the stratum would correspond to 79 kg. steam and from which 21.0 kw./h. could be produced and with which by the treatment of 144 m.³ of the stratum per hour, about 2.750 kw./h. are delivered up. With this energy it is possible to perform all the necessary operations in the mineral oil field and production installations.

In the production of a modified gas of combustion under high pressure in the fire chamber of a steam boiler, the oxidation leads to complete combustion of all the fuel directly into water vapor and carbon dioxide if other lesser ingredients such as sulfur are ignored. It is possible, however, and with the heavier hydrocarbons partly necessary, that a slight excess of oxygen be used in order to prevent the formation of soot, even when water vapor is already present in the combustion chamber. This excess of oxygen should, however, be limited, as too high an oxygen content may have injurious effects on the walls of the fire chamber of the steam boiler. While a 3 to 21% oxygen content in the gases of combustion has no injurious effect on the steam boiler, it will, however, be sufficient under favorable conditions to support a subsequent combustion in the stratum and can be assisted by raising the temperature of the gases. Such oxygen containing gases are thus converted into activated gases of combustion.

In deposits which already have an easily flowable liquid content, or only a small density, the above-mentioned oxygen content will be sufficient, but deposits with greater densities of combustible components require greater amounts of oxygen in the gases of combustion. Low densities occur where the porous material of the stratum contains, besides oil, also free natural gas or where only residual amounts of liquid or solid components are present. A high density of the combustible components occurs in mineral oil deposits whose pores are filled with liquid mineral oil or where the deposit consists of coal.

In deposits which contain only liquid or solid components and which therefore have a high density, the velocity of movement of the gases of combustion is much greater than that of the combustible material, which has little if any movement. The combustion, however, causes partial gasification and vaporization. The conditions in the region of combustion must be controllable by regulation of the oxygen supply from above ground.

Where the word "oxygen" is here used, it means a nitrogen-oxygen mixture containing 85 to 97% oxygen. The gasification, degassing and vaporization are heat consuming processes so that with inadequate combustion temperatures there may occur some easily oxidative changes below the kindling temperature, using up additional oxygen and adversely affecting the deposits to be exploited. Such low temperature oxidation increases the viscosity of the mineral oil and produces too much worthless carbon dioxide in the coal. Such injurious side reactions can be avoided by providing the activated gases of combustion with a sufficiently high oxygen content. If, however, the gases of combustion which have only a slight excess of oxygen are introduced into the upper portion of the stratum which is filled with adhering oil and hydrocarbon gases, then the after-burning will occur primarily in light gaseous hydrocarbons which flow through the upper portion of the stratum with about the same velocity as the activated gases of combustion and which thereby definitely improve the workability of the stratum.

Into such a stratum can be introduced modified gases of combustion containing 3 to 21% of free oxygen which can be obtained from the fire chamber of a steam boiler operating at about 100 atm. pressure. A portion of the steam from a boiler operating at 105 atm. can be added to these gases of combustion. To make sure that this activated gas of combustion with its small amount of free oxygen does not reach that portion of the stratum in which the pores are filled with liquid, a packing with a separate conduit is introduced at the lower portion of the stratum so that oxygen poor gases of combustion can be introduced into the stratum above the packing and gases of combustion which are strongly enriched with oxygen introduced into the stratum below the packing. For pervious strata containing bitumens such as mineral oil or coal, or those which have been made pervious, it is suggested that a modified activated gas of combustion be given a wider range of action by an activated gas of combustion by the following procedure. To the added oxygen are added steam and carbon dioxide. These additives may condense or dissolve in the deposits, but in the region of combustion they become reaction partners and assist in converting the combustion zone into a gasification zone. As the schematic representation of the table of FIGURE 2 shows, the individual components of the first working operation can be mixed in a preliminary step designated V (mixing). This preliminary step, however, can also constitute the first working operation if the carbon dioxide is obtained during a pressure washing operation so that by the addition of steam and oxygen, an activated gas of combustion is produced. In the table, this working process is designated V, W 1+2. The activated gas of combustion is used in four working processes, two of which are performed in a step above ground, and two underground in the deposit as the second process step. In the table, these four working operations are designated $W_1$, $W_2$, $W_3$ and $W_4$. This subdivision of the procedure into four working operations makes it readily applicable to all kinds of deposits with different contents and makes it possible to obtain good yields of technically useful gaseous and liquid products, the individual components of the activated gases of combustion being useful in various ways including their use as fuels whereby oxygen is formed.

The first working operation $W_1$ is the production of modified gas of combustion by burning the contents of the deposit, and especially the gaseous contents, above ground under pressure with enriched oxygen in the fire chamber of a steam boiler.

The addition of enriched oxygen to the gas of combustion in the second working operation $W_2$, produces an activated gas of combustion, and this constitutes the first process step. In the third working operation $W_3$, the activated gas of combustion supports combustion in the deposit. In this third working operation, in addition to the properties of the gases of combustion, there is also a considerable delivery of heat to the contents of the stratum, and during the combustion there is an additional product of modified gas of combustion $W_4$. This is the fourth working operation while the last two working operations together form the second underground process step.

The reason for this subdivision into four working operations is that in two of the operations comprising the first process step the activated gas of combustion acquires a composition which is suitable for the contents of the stratum being worked, and the individual differently selected components of this activated gas of combustion act upon the contents of the stratum in the second process step with heat, solutions and chemical changes in such a favorable manner that a high yield of good products is obtained. The steam which condenses in the oil produces tiny droplets of water which together with the oil will dissolve the $CO_2$ in the stratum. These water droplets will be moved along together with the oil. The active agents of this activated gas of combustion are the heat of condensation of the steam, the sensible heat of the carbon dioxide and of the small amount of nitrogen in the modified gas of combustion, the heat of combustion of the contents of the stratum by means of oxygen, the newly produced gases of combustion which have resulted from such in situ combustion, the condensation of the steam from the latter, and the sensible heat of the gaseous components which go into solution. The latent heat in the latter case is ignored. Besides these, there is also the generation of steam by the production of the modified gas of combustion in the steam boiler above ground, some of that steam being added to the gas of combustion although most of it is used for driving electric generators to provide the necessary electricity for the process.

In the two process steps, these six above-mentioned interrelated heat sources are factors which act over a large area in the stratum so that the main source of heat in the combustion front with the simultaneous gasification can always work under nearly the same conditions. Five of these six sources of heat prepare the stratum for the introduction of the enriched oxygen. The burning of portions of the deposit by this oxygen is a technical process which has to be kept under control. The performance of four of the working operations with the use of activated gases of combustion has, however, for its main object to keep this burning with the components of the modified gases of combustion under control. The burning is performed so that in strata containing liquid and solid components, the transformations will not adversely affect the deposits and will generate gases some of which serve as the return gas R of the table of FIGURE 2, and with a small amount of steam and carbon dioxide are put back into circulation in the first working operation to form a new modified gas of combustion. If liquid or solid deposits become exhausted by being burned underground according to known processes, the burning processes will occur uncontrolled and unsatisfactory at lower temperatures. Considerable amounts of free oxygen will be carried along by the products of combustion through the stratum ahead of the burning zone and will cause oxidation of the deposits at temperatures below the kindling temperature which not only causes a substantial loss of bitumens but also renders the remaining bitumens less valuable by increasing the viscosity of the liquid bitumens. If, however, activated gas of combustion with a large oxygen content is introduced into the stratum, then it will be possible, even in deposits of high density, to keep the temperature high enough in the region of combustion so that notwithstanding the vaporization and gasification of the contents of the stratum by heat consuming processes in and ahead of the burning front, it will be possible for a reduction zone to form where true gasification will occur, even though such gasification will itself absorb heat.

The expression "reaction zone" is used for the reduction zone used in conjunction with an increased introduction of oxygen into activated gas of combustion producing a higher velocity of reaction with improved equilibrium conditions. It is known that oxygen increases the velocity of reaction and it is also known that the equilibrium conditions for the transformations change rapidly only at high temperatures. Substances for changing the equilibrium conditions are, therefore, introduced into the hottest zone together with the oxygen. The steam and the carbon dioxide components are added to the activated gas of combustion in amounts that are sufficient to permit adequate amounts thereof to act as reaction partners while migrating through the reaction zone and to be converted in regions of sufficiently high temperature into free hydrogen, carbon monoxide and corresponding free oxygen. If the hydrogen and carbon content of the stratum is known, the degree of conversion of the steam and carbon dioxide can be determined by a gas analysis.

Since water vapor and carbon dioxide at the same temperatures and in a certain pressure range will react differently according to their concentrations, it is possible from the extent of such reactions to determine the temperature of the reaction zone.

In view of the heat absorbed by the reaction and the measurable degree of conversion, the amounts of steam and carbon dioxide in activated gas of combustion and their relative proportions have a definite significance and if considered in conjunction with the contents of the stratum can be proportioned so as to control the reactions underground. In a modified gas of combustion the components steam and carbon dioxide can be so proportioned that the activated gas of combustion in the third working operation can serve additionally as an impulse and reaction agent for every kind of stratum content.

The activated gas of combustion with its soluble components can be transmitted mechanically through the deposits with a wide range of compositions so that in the energy rich region of the reaction zone high temperatures will always prevail and so that the results of gas analysis will provide information about the reaction process. In some cases it may be necessary to ascertain the dissolved gas components which were transmitted with liquid products and to figure them into the values obtained by gas analysis. The conditions prevailing in the stratum can be ascertained therefrom.

The gases which have resulted from the gasification of hydrocarbons by steam, carbon dioxide and oxygen dissolve completely in the contents of the stratum in front of the gasification region with a generation of heat according to the temperature and at pressures of above 20 to 30 atm., so that great increases of pressure by such gases will not be felt at the injection borings.

From the reaction zone the burned, gasified and vaporized hydrocarbons will flow out with the components of the gases of combustion at a higher temperature and form a gaseous but not a wide barrier between the combustion zone and the liquid contents of the stratum. In or closely behind this narrowly limited region the last traces of oxygen which have become dissolved with increased concentration in their portion of the mixture will be consumed since the temperature in these regions will be above the ignition temperature. It is possible with the soluble components of the activated gases of combustion to operate with borings spaced 200 m. from one another in a stratum containing only small amounts of difficulty soluble gases in comparison with its total contents. As the injected gases become dissolved in the liquid contents of the stratum, greater amounts of oxygen can be introduced. It can be shown that the large volume of the activated gas of combustion will move ahead rapidly in only that portion of the stratum which has been depleted.

After separation of the carbon dioxide by washing it out under pressure, the resulting gases when used for heating purposes will provide 3500 Cal/Nm.³. This separated carbon dioxide from a pressure washing or the carbon dioxide that is obtained by the degassing of liquid products from the stratum can be added in required amounts to the modified gases of combustion.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the extensive recovery of liquid and solid bitumens from underground deposits comprising the following steps:

(a) locating at least one relatively deep flooding boring, at least one relatively shallow production boring, at least one treatment borning and at least one leading boring, said flooding and production borings having a first predetermined direction from one another, said treatment and leading borings located between said flooding boring and said production boring and having a second predetermined direction apart from one another in a stratum of an underground deposit of bitumens said second direction different from said first direction;

(b) introducing into said treatment boring an activated gas of combustion comprising oxygen and hot modified gas of combustion comprising steam and carbon dioxide;

(c) developing a hot reaction zone between at least one of said treatment borings and at least one of said leading borings having a given tempearture range by the sensible heat of said gas of combustion and the reaction of a portion of said bitumens and oxygen;

(d) converting a portion of said steam and carbon dioxide in said reaction zone into oxygen, carbon monoxide and hydrogen;

(e) forming a cyclic process in said stratum between said treatment boring and said leading boring comprising removing the liquid stratum contents from said leading boring as a partial product, separating the gaseous components comprising hydrocarbons, carbon monoxide, hydrogen, carbon dioxide and steam, burning said gaseous components with oxygen to produce a modified gas of combustion, adding oxygen to said modified gas of combusion producing an activated gas of combustion and introducing said activated gas of combustion into said treatment boring for maintaining the circulation;

(f) determining the composition of said modified gas of combustion from (e) and maintaining said given temperature range of (c) by varying the oxygen content and rate of addition of said activated gas of combustion from (e) into said treatment boring; and (g) adding flooding water to said flooding borings increasing the pressure and displacing the stratum contents in said first direction of the production boring and removing the stratum contents through the production boring.

2. A process for the extensive recovery of liquid and solid bitumens from underground deposits comprising the following steps:

(a) locating at least one relatively deep flooding boring, at least one relatively shallow production boring, at least one treatment boring and at least one leading boring, said treatment and leading borings located between said flooding boring and said production boring and spaced a predetermined direction apart from one another in a stratum of an underground deposit of bitumens;

(b) introducing into said treatment boring an activated gas of combustion comprising oxygen and hot modified gas of combustion comprising steam and carbon dioxide;

(c) developing a hot reaction zone between at least one of said treatment borings and at least one of said leading borings having a given temperature range by the sensible heat of said gas of combustion and the reaction of a portion of said bitumens and oxygen and producing additional modified gases of combustion;

(d) conducting further into said stratum ahead of said reaction zone said additional modified gases of combustion from (c), where they condense and dissolve to form a liquid phase with the contents of the stratum; and (e) advancing said reaction zone and displacing ahead of it the stratum contents with the condensed and dissolved gas of combustion in the direction of the production boring by the introduction of water through said flooding boring, and removing the advanced stratum contents through the production boring.

3. A process for the extensive recovery of liquid and solid bitumens from underground deposits comprising the following steps:

(a) locating at least one relatively deep flooding boring, at least one relatively shallow production boring, at least one treatment boring and at least one leading boring, said treatment and leading borings located between said flooding boring and said production boring and spaced a predetermined direction apart from one another in a stratum of an underground deposit of bitumens;

(b) producing an activated gas of combustion comprising oxygen and a hot modified gas of combustion comprising steam and carbon dioxide, forcing this gaseous mixture with a given pressure into said treatment boring and increasing the steam content by steam generated from flooding water injected via the flooding boreholes into contact with the hot rock formation in the burned out stratum;

(c) building up a hot reaction zone between a treatment boring and a leading boring, said zone having a given pressure range and a given temperature range by the sensible heat of the gases of combustion from the reaction of a portion of the bitumens with the oxygen and by the increased amount of steam in the stratum whereby the liquid components of the stratum contents maintain smaller partial pressures;

(d) varying said partial pressure of the liquid stratum contents by changing the amount of steam and carbon dioxide and by changing said pressure;

(e) converting a portion of steam and carbon dioxide in the reaction zone into hydrogen, carbon monoxide and oxygen;

(f) establishing a circulation in the stratum between the treatment boring and the leading boring, removing liquid stratum contents from the leading boring as a partial product, separating the gaseous components consisting of carbon monoxide, hydrogen, hydrocarbons, carbon dioxide and steam and burning of said gaseous components with oxygen producing a modified gas of combustion, producing an activated gas of combustion by the addition of oxygen with the modified gas of combustion, and introducing said activated gas of combustion into said treatment boring and maintaining the circulation;

(g) measuring the compositions of the separated gaseous components of (f) and maintaining the temperature range chosen for (c) by varying the oxygen content and the amount of the gaseous mixture introduced into the treatment boring in (f); and (h) introducing flood water into the flooding boring whereby additional steam is produced in (b) and the pressure in (d) is varied, and removing the heated deposit contents through the production boring.

4. The process of claim 3, wherein the saturated steam produced from the flooding water by contact with the hot rock formations in the stratum is passed through the reaction zone as in (c) at an angle to the axis of the reaction zone by the pressure difference between the flooding boring and the production boring with the production of superheated steam, forming thereby a steam filled canal in front of and behind the reaction zone and condensing said steam in front of the reaction zone while warming the sections in front of said reaction zone.

5. A process for the extensive recovery of liquid and solid bitumens from underground deposits comprising the following steps:

(a) locating at least one relatively deep flooding boring, at least one relatively shallow production boring, at least one treatment boring and at least one leading boring, said treatment and leading borings located between said flooding boring and said production boring and spaced a predetermined direction apart from one another in a stratum of an underground deposit of bitumens;

(b) introducing into said treatment boring an activated gas of combustion comprising oxygen and hot modified gas of combustion comprising steam and carbon dioxide;

(c) developing a hot reaction zone between at least one of said treatment borings and at least one of said leading borings having a given temperature range by the sensible heat of said gas of combustion and the reaction of a portion of said bitumens and oxygen;

(d) forcing the gaseous mixture of (b) into said treatment boring through the deposit and into said leading boring and moving the axis of the reaction zone at an angle substantially perpendicular to the direction of flow of heated deposit contents, said direction of flow, being caused by the drop of pressure in the direction from the flooding boring to the producing boring; and (e) forcing flooding water into said flooding boring for producing a drop of pressure toward said production boring, and obtaining stratum contents from said production boring.

6. The process of claim 5, wherein the gaseous mixture is conducted in greatly varying amounts alternately into the treatment boring and into the leading boring according to (d) in such a manner that the total amount of gaseous mixture is introduced at a constant rate while the direction of flow in the reaction zone is reversed.

7. The process of claim 6, wherein the amounts of gaseous mixtures that are introduced into the treatment boring and into the leading boring are varied in such a manner that the regions around the treatment boring and around the leading boring are under different and changed pressures so that the associated volume changes will produce a flow in the axial direction of the reaction zone and a transverse flow whereby the oxygen of the gaseous mixture is distributed more actively in the stratum.

8. A process for the extensive recovery of liquid and solid bitumens from underground deposits comprising the following steps:
(a) locating at least one relatively deep flooding boring, at least one relatively shallow production boring, at least one treatment boring and at least one leading boring, said treatment and leading borings located between said flooding boring and said production boring and spaced a predetermined direction apart from one another in a stratum of an underground deposit of bitumens;
(b) positioning double packings in said treatment boring and in said leading boring through which packings superimposed deposits having different packing densities in the interior of said stratum are made accessible through separate pipelines in the borings;
(c) producing an activated gas of combustion comprising a hot modified gas of combustion and oxygen, forcing a gaseous mixture with low oxygen content into the stratum above the packing where the packing density is small and forcing a gaseous mixture with high oxygen content into the stratum below the packing where the packing density is high;
(d) producing in said stratum above said double packing in the region of low packing density a circulation between the treatment boring and the leading boring, withdrawing stratum contents through the leading boring from the space above the packing, burning said contents with oxygen to produce a modified gas of combustion, producing an activated gas of combustion by mixing small amounts of oxygen with the modified gas of combustion, and introducing said activated gas of combustion into the treatment boring and into the stratum above the double packing to maintain the circulation;
(e) simultaneously producing in the stratum below said double packing in the region of high packing density a circulation between the treatment boring and the leading boring, removing liquid stratum contents from the region below the double packing through the leading boring as a partial production, separating therefrom the gaseous components consisting of hydrocarbons, carbon monoxide, hydrogen, carbon dioxide and steam, burning said gaseous components with oxygen to produce a modified gas of combustion, producing an activated gas of combustion by the admixture of large amounts of oxygen therewith and introducing this gaseous mixture throughh the treatment boring into the region below the double packing to maintain the circulation;
(f) maintaining above and below the double packing circulations as in (d) and (e) with different oxygen contents and with such amounts of activated mixtures of gases of combustion that combustion will occur at the same rate in the region of low packing density as in the region of high packing density; and
(g) forcing flooding water into the flooding boring to increase the pressure and to displace the stratum contents in the direction of the production boring, and withdrawing the stratum contents through the production boring.

9. The process of claim 8, wherein light and gaseous hydrocarbons obtained through leading borings from deposits containing regions with small packing densities are burned with such an excess of oxygen that an activated gas of combustion with an oxygen content of 3 to 21% is produced directly without the admixture of more oxygen.

10. The process of claim 9, wherein the production of activated gas of combustion with an oxygen content of 3 to 21% is accomplished under an increased pressure at least equal to the pressure with which the activated gas of combustion is forced into the treatment boring.

11. The process of claim 8, wherein the activated gases of combustion are produced by mixing the carbon dioxide and steam from a production boring with oxygen under a pressure sufficient to force these gases into the treatment boring.

12. A process for the extensive recovery of liquid and solid bitumens from underground deposits comprising the following steps:
(a) locating at least one relatively deep flooding boring, at least one relatively shallow production boring, at least one treatment boring and at least one leading boring, said treatment and leading borings located between said flooding boring and said production boring and spaced a predetermined direction apart from one another in a stratum of an underground deposit of bitumens;
(b) setting double packings in said treatment boring and in said leading boring inside the stratum whereby an upper and a lower stratum are attainable by two separate conduits;
(c) producing an activated gas of combustion comprising a hot modified gas of combustion and oxygen, forcing this gaseous mixture through the treatment boring into the stratum above the double packing;
(d) establishing a hot reaction zone in the upper stratum between the treatment boring and the leading boring with the temperature kept in a given range by the sensible heat of the gas of combustion and by the reaction of a portion of the bitumens with oxygen;
(e) converting a portion of the steam and carbon dioxide in the reaction zone into carbon monoxide and oxygen;
(f) establishing a circulation in the upper stratum between the treatment boring and the leading boring, withdrawing some of the liquid stratum contents from the stratum above the packing through the leading boring as a partial product, separating therefrom the gaseous components comprising hydrocarbons, carbon monoxide, hydrogen, carbon dioxide and steam, burning said gaseous components with oxygen producing a modified gas of combustion, producing an activated gas of combustion by admixture of oxygen with the modified gas of combustion, and introducing this gaseous mixture into the treatment boring above the double packing maintaining the circulation;
(g) introducing flooding water through the treatment boring into the stratum below the double packing, simultaneously with the forcing of the gaseous mixture through the treatment boring and into the stratum above the packing as in (c);
(h) withdrawing warm flooding water from the lower stratum through the leading boring below the double packing and introducing warm flooding water into the lower stratum through the treatment boring below the double packing simultaneously with the maintenance of the circulation in the upper stratum as in (f); and
(i) forcing flooding water into the flooding boring to increase the pressure and displace the stratum contents in the direction of the production boring, and removing the stratum contents through the production boring.

13. The process of claim 12, wherein flooding water is delivered at such a rate from the leading boring below the double packing that a bulging of the floodwater level at the leading boring is prevented sufficiently to avoid obstructing the flow paths of gases to be removed through the leading boring from the stratum above the double packing.

14. The process of claim 12, wherein a modified gas of combustion with a major amount of nitrogen, is mixed with oxygen to produce an activated gas of combustion which is then forced into the treatment boring, whereby the injected gaseous mixture contains a non-condensible and insoluble nitrogen component, the latter functioning in part as a substitute for the flooding water in displacing the stratum contents.

15. The process of claim 12, wherein the presence of substantially horizontal strata, flooding water is introduced into the treatment boring in such amounts that the strata will be filled from the bottom up while the supernatant hydrocarbons are displaced upwardly so that a direction of movement will be established in a direction forming angle, up to 90°, with the direction of flow of the gas of combustion between the treatment boring and the leading boring above the double packing.

References Cited
UNITED STATES PATENTS

| | | | |
|---|---|---|---|
| 2,695,163 | 11/1954 | Pearce et al. | 166—11 |
| 2,734,578 | 2/1956 | Walter | 166—11 |
| 2,788,956 | 4/1957 | Pevere et al. | 166—11 |
| 2,839,141 | 6/1958 | Walter | 166—11 |
| 2,906,337 | 9/1959 | Hennig | 166—11 |
| 3,132,692 | 5/1964 | Marx et al. | 155—40 X |

CHARLES E. O'CONNELL, *Primary Examiner.*
STEPHEN J. NOVOSAD, *Examiner.*